2 Sheets—Sheet 1.

P. H. SWEET, Jr.

Assignor to W. A. BOLAND.

MACHINE FOR ATTACHING BUTTONS TO SHOES.

No. 10,373. Reissued Aug. 21, 1883.

Witnesses.
John F. C. Preinkert
Geo. M. Finckel

Inventor:
Parker H. Sweet Jr.
by Wm. H. Finckel atty.

N. PETERS, Photo-Lithographer, Washington, D. C.

P. H. SWEET, Jr.

Assignor to W. A. BOLAND.

MACHINE FOR ATTACHING BUTTONS TO SHOES.

No. 10,373. Reissued Aug. 21, 1883.

Witnesses.

John P. C. Reinhart

Geo. M. Dinckel

Inventor:

Parker H. Sweet, Jr.

by Wm. H. Dinckel, Atty.

N. PETERS, Photo-Lithographer, Washington, D. C.

UNITED STATES PATENT OFFICE.

PARKER H. SWEET, JR., OF WASHINGTON, DISTRICT OF COLUMBIA, ASSIGNOR TO WILLIAM A. BOLAND, OF LYNN, MASSACHUSETTS.

MACHINE FOR ATTACHING BUTTONS TO SHOES.

SPECIFICATION forming part of Reissued Letters Patent No. 10,373, dated August 21, 1883.

Original No. 268,143, dated November 28, 1882. Application for reissue filed July 11, 1883.

*To all whom it may concern:*

Be it known that I, PARKER H. SWEET, Jr., a citizen of the United States, residing at Washington, in the District of Columbia, have invented certain new and useful Improvements in Machines for Attaching Buttons to Shoes or other Articles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has for its object to provide an improved machine for automatically attaching buttons to shoes or other articles of wearing-apparel by means of a metallic tack or other suitable metallic fastening device; and my improvements consist, essentially, of a supporting-frame provided with a vertical plunger operated by a series of levers through the medium of a foot-treadle or other suitable power, the said plunger being either magnetized or provided with holding-jaw of any well-known form, to receive and hold the metallic fastener preparatory to driving it to connect the button with the fabric, as will be hereinafter described.

It also consists of an improved means for automatically feeding both the buttons and the metallic fasteners into position to be attached to the desired material.

It further consists of other details of construction and general arrangement of parts, all as will be hereinafter more fully described, and specially designated in the claims.

Figure 1:
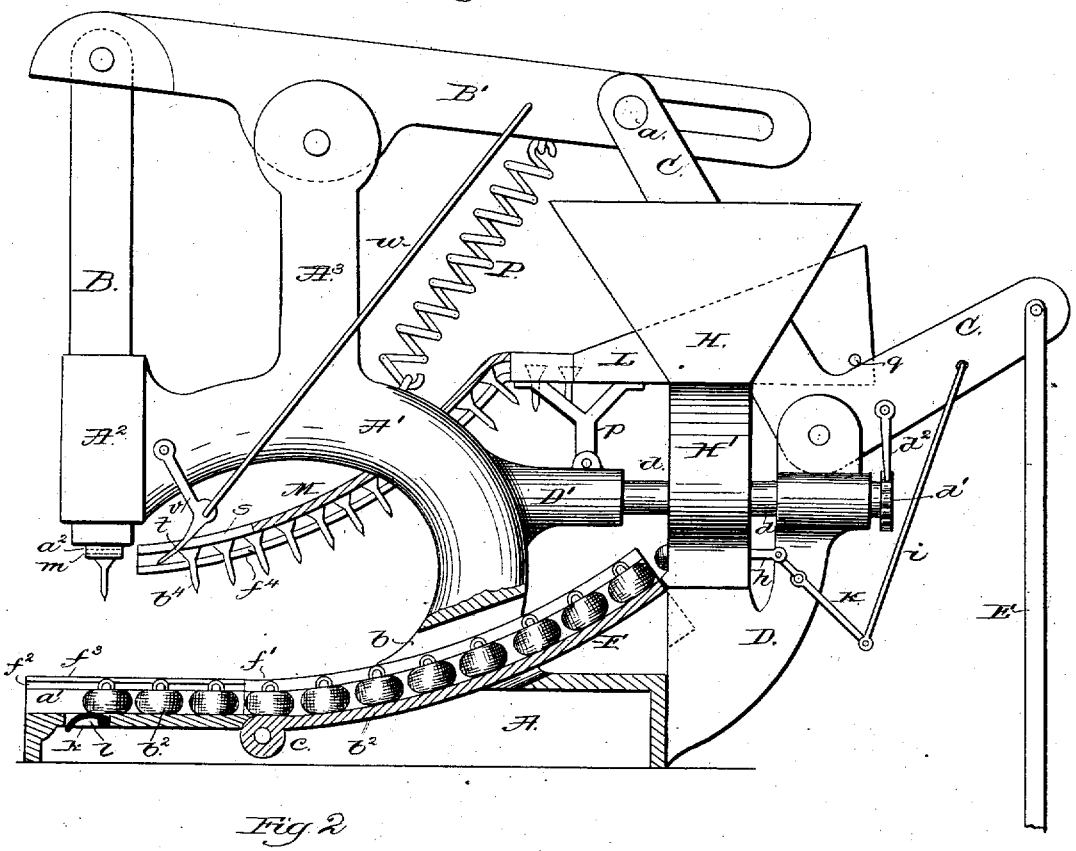
Figure 2:
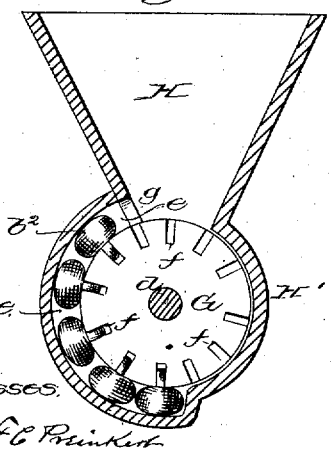
Figure 3:
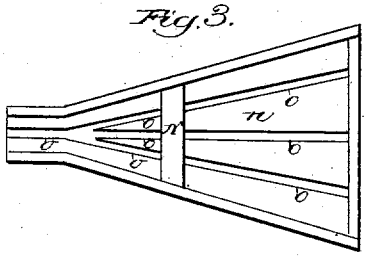
Figure 4:
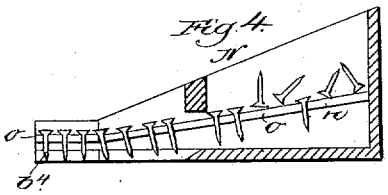
Figure 5:
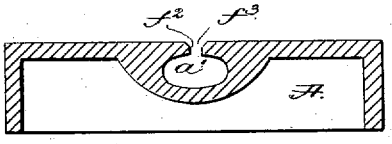
Figure 6:
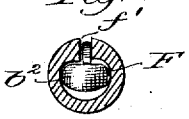
Figure 7:
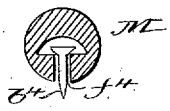

In the accompanying drawings, Figure 1 represents a side elevation of my improved machine, with parts broken away to more fully show its construction. Fig. 2 represents a detail sectional view of a hopper for distributing the buttons. Fig. 3 represents a top plan view of the hopper for distributing the metallic fasteners. Fig. 4 represents a vertical section of the same. Fig. 5 represents a vertical section of the recess for holding the button, with the concave die for deflecting the prong or prongs of the fastening device through the shank of the button to attach it to the desired material. Figs. 6 and 7 represent detail sectional views of the inclined conducting-chutes for the buttons and metallic fasteners.

Similar letters of reference occurring on the several figures indicate corresponding parts.

Referring to the drawings, A represents the base of my improved machine, which is provided with a curved arm, A′, terminating in a hollow cylindrical support, $A^2$, which is adapted to receive the vertically-sliding plunger or driver B, as fully shown in Fig. 1.

Projecting upward from the curved arm A′, and cast solid therewith, is an upright, $A^3$, in the upper part of which is pivoted a horizontal lever, B′, to the front end of which is pivoted the upper end of the vertical plunger B, while the rear end of said lever is slotted for the engagement therewith of a pin, *a*, of the elbow-lever C, which is pivoted in its turn, at its center, to a projection, D, at the rear of the base-plate A. To the outer end of this elbow-lever C is pivoted a pitman or rod, E, which is connected at its bottom to a suitable treadle for operating the machine.

F represents an inclined button-guiding chute or conductor, which passes through a recess, *b*, in the arm A′, and which is pivoted in one end near the front of the base A, as shown at *c*, while its rear end abuts against the lower end of the casing of the distributing-wheel G in such a manner as to receive the buttons as they are ejected from the same. The hopper H is of usual form, and mounted upon a cylindrical case, H′, which in turn is mounted upon the projection D at the rear of the base A.

Within the walls of the cylindrical case H′ is journaled the distributing-wheel G by means of the axle *d*, a space or recess, *e*, being provided at one side and at the bottom, between said wheel and case, for the passage of the button-heads, as fully shown in Fig. 2 of the drawings. Upon the face of the wheel, and at suitable distances apart, are provided slots or recesses *f*, for the reception of the shanks of the buttons $b^2$, to permit the button-heads to pass through the opening *g* down into the space or recess *e*. At the extreme lower part of the said recess, and beneath the wheel G, is provided a rod, *h*, which projects through the casing H′, and abuts against the button at the bottom of the said recess to eject or push it outward into the conducting-chute F, said rod being pivoted to one end of the lever K, which is also pivoted at its center to the projection D in the rear of the machine, a suitable rod, *i*, connecting said lever with the elbow-lever C, to derive the desired motion.

Upon the outer end of the axle *d*, carrying distributing-wheel G, is arranged a ratchet-wheel, *d'*, the teeth of which are engaged by the stationary pawl $d^2$ upon the elbow-lever C, to impart motion to the said wheel G, the ends of the axle *d* being journaled in the projection D and a projection, D', of the main frame of the machine, as fully shown in Fig. 1.

The conducting-chute F is preferably of a circular form in cross-section, with a slot, *f'*, in its upper surface for the reception of the shanks of the buttons, to keep the same in proper position to receive the prong or prongs of the metallic fastener $b^4$, the lower end of the said chute connecting with a circular recess or cavity, *a'*, in the base A of the machine, and which extends to and opens out at the front of the same. The upper part of the recess *a'* is provided with a slot, $f^2$, terminating on its upper surface with a concave groove or die, $f^3$, to curve or deflect the point of the metallic fastener held in the jaw of the plunger or driver B down through the shank of the button, as fully shown in Fig. 5.

In the lower part of the recess or cavity *a'*, near the front of the base A, is provided an opening, *k*, which is adapted to receive a curved spring, *l*, which acts as a stop to arrest and hold the first and each succeeding button as it slides down from the chute F in a position to receive the prong of the fastener.

M represents an inclined tack or fastener conductor or chute for supplying the metallic tacks or fasteners to the plunger B, said conductor being of a shape similar to that of the chute F, with the exception that the groove or slot $f^4$ is in the lower part of the same, instead of at the top, to allow the points of the metallic tacks or fasteners to project downward, as shown. The lower part of the plunger, constituting the holding-jaw, is preferably provided with a magnet, *m*, to hold the iron or steel tack in position to be affixed to the shank of the button held in the recess *a'* directly beneath; but where the fastening device is made of other metals than iron or steel a slot, $a^2$, may be formed in the lower part of the plunger B to receive the same, or any of the well-known forms of holding-jaw may be used. The upper end of the chute or conductor M projects against the mouth of a distributing-hopper, L, which feeds the metallic tacks or fasteners down through said chute to the holding-jaw of the plunger B. The distributing-hopper L is composed of a suitable frame open at the top, and provided with a slotted and inclined tray, *n*, arranged horizontally across said frame at or about its center. The slots *o*, which extend through the said tray, terminate in a single slot in the end of the tray for distributing the tacks one after another into the conducting-chute M, a partition or board, N, extending across the said tray at such a height above the same as to leave only a space sufficient to allow the heads of the tacks to pass under after the points of the tacks have dropped downward in the slots. This hopper L is attached to the top of a standard, *p*, which is pivoted at its bottom to a projecting lug on the curved arm A', and a lug or pin, *q*, projecting from the side of the said hopper engages with the curve of the elbow-lever C to impart a slight shaking motion to the same, so that the points of the metallic tacks will project down through the slots *o* in the tray *n*, for distribution to the conductor M. A recess or opening, *s*, is provided in the upper surface of this conductor, near the plunger B, to permit of the entrance of the tack-separator, shown as a finger, *t*, of the lever *v*, which is pivoted to the arm A' and operated by the rod *w*, pivoted thereto and to the lever B', as fully shown in Fig. 1. The object of this mechanism is such that the metallic tacks are pushed one after another upon the holding-jaw of the plunger B with each successive motion of the lever B'. A suitable coiled spring, P, is arranged between the curved arm A' and the lever B', to force the plunger B back to its proper position after each downward stroke of the same. The conducting-chutes F and M, with their distributing-hoppers, may be changed or reversed, so that the button may be fed down to the holding-jaw of the plunger B and the metallic tacks or fasteners down to the recess in the base of the machine, directly under said plunger, without departing from the spirit of my invention.

In the operation of my improved machine the buttons are thrown loosely into the hopper H, from which they are distributed in proper position to the chute F by means of the distributing-wheel G, while the tacks or fasteners are assorted in the hopper L and fed down the inclined chute M, the finger *t* of the lever *v* pushing the first and each succeeding tack upon the holding-jaw *m* of the plunger B with each upward motion of the said plunger. The material or fabric to which the button is to be attached is placed upon the table of the base A, directly over the first button, near the outer end of the recess *a'* of the said base A. The plunger B, carrying the metallic tack or fastener, is now brought down by depressing the foot-treadle, which operation causes the point of the metallic tack to pass through the said material or fabric down upon the concave die $f^3$, where it is curved or deflected through the shank of the button and back upon or into the material, thereby firmly securing the button thereto. Now, by pulling the material forward, the button depresses the spring *l* in the groove *k* and allows the button to easily slip out of the recess *a'*. The next succeeding button now slips down against the spring *l* or stop, and as the plunger B returns to its former position the finger *t* of the lever *v* pushes another metallic tack in place with relation to the plunger, to enable the latter to act upon and drive the said tack to set the next button; and this operation is repeated until the supply of buttons and fasteners is exhausted.

Having thus described my invention, what I claim as new and useful is—

1. In a machine for attaching buttons to shoes or other articles, a chute or conductor through which to convey a series of buttons and a chute or conductor through which to convey a series of metallic tacks or fastenings, combined with a plunger adapted to drive a tack or fastening, and an anvil or die to curve or deflect the point of the tack about the shank of the button after passing through the material, in order to affix the shank of the button to the said material, substantially as described.

2. In a machine for attaching buttons to shoes and other articles, a chute or conductor to convey a series of buttons, a chute or conductor to convey a series of metallic tacks or fastenings, a plunger to drive the said tacks or fastenings, and means to control the delivery singly of the tacks from the tack-conducting chute to the plunger, combined with a die to deflect and curve the point of the tack through and about the eye of the button, substantially as described.

3. In a machine for attaching buttons to shoes and other articles, a chute or conductor to convey a series of buttons, a hopper to supply the said chute or conductor, a chute or conductor to convey a series of metallic tacks or fastenings, a plunger to drive the said tacks or fastenings, and means to control the delivery singly of the tacks from the tack-conducting chute to the plunger, combined with a die to deflect and curve the point of the tack through and about the eye of the button, substantially as described.

4. In a machine for attaching buttons to shoes and other articles, a plunger to drive a tack or fastener, a chute through which to conduct tacks or fasteners to the said plunger, an anvil against which to clinch the said tacks or fasteners, and a chute or conductor to direct buttons, combined with a spring or stop to determine the position at which the button to be attached is held with relation to the anvil and path of movement of the tack or fastener by the plunger, substantially as described.

5. In a machine for attaching buttons to shoes and other articles, the inclined conductors F and M, provided, respectively, with the hoppers H and L and their feed mechanisms, in combination with the plunger B, having a holding-jaw, *m*, and the recess *a'* in the base of said frame, and an anvil, and a stop for the buttons to be set, substantially as and for the purpose specified.

6. The hopper H, mounted upon the cylindrical casing H', and provided with the distributing-wheel G, having slots *f*, and central axle, *d*, a space, *e*, being provided at one side and at the bottom of said wheel and casing, in combination with the inclined conductor F, projections D D', rod *h*, lever K, connecting-rod *i*, ratchet-wheel *d'*, and pawl $d^2$, substantially as and for the purpose specified.

7. The hopper L, provided with the tray *n*, having vertical slots or openings *o*, and partition N, in combination with the inclined conductor M, substantially as and for the purpose specified.

8. In a machine for attaching buttons to boots and shoes and other articles, means, substantially as described, to hold a button in position, a tack conductor or chute, and a separator to detach the tacks therefrom, combined with a plunger to drive the tacks and an anvil upon which to clinch the same, substantially as described.

PARKER H. SWEET, JR.

Witnesses:
F. M. GREEN,
WM. H. FINCKEL.